US006475313B1

(12) United States Patent
Peterson et al.

(10) Patent No.: US 6,475,313 B1
(45) Date of Patent: Nov. 5, 2002

(54) PROCESS FOR MAKING GYPSUM BOARD HAVING IMPROVED THROUGH-PENETRATION STRENGTH

(75) Inventors: Kurt N. Peterson, Palatine, IL (US); Gerry L. Heschel, Port Clinton, OH (US); Dick C. Engbrecht, Arlington Heights, IL (US); Frederick T. Jones, Grayslake, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 09/665,880

(22) Filed: Sep. 20, 2000

(51) Int. Cl.$^7$ ......................... B32B 13/00; B32B 31/08; B32B 31/12

(52) U.S. Cl. .............................. 156/39; 156/42; 156/44

(58) Field of Search .............................. 156/39, 42, 43, 156/44

(56) References Cited

U.S. PATENT DOCUMENTS

| | | | | | |
|---|---|---|---|---|---|
| 1,439,954 | A | * | 12/1922 | Emerson | 428/140 |
| 4,265,979 | A | * | 5/1981 | Baehr et al. | 428/171 |
| 4,504,533 | A | | 3/1985 | Altenhofer et al. | |
| 4,853,085 | A | * | 8/1989 | Johnstone et al. | 162/128 |
| 5,320,677 | A | | 6/1994 | Baig | |
| 5,350,554 | A | * | 9/1994 | Miller | 264/171 |
| 5,718,797 | A | | 2/1998 | Phillips et al. | |
| 6,190,476 | B1 | * | 2/2001 | Seecharan et al. | 156/39 |
| 6,391,131 | B1 | * | 5/2002 | Newman et al. | 156/39 |

FOREIGN PATENT DOCUMENTS

WO WO 99/04112 1/1999

* cited by examiner

*Primary Examiner*—Michael W. Ball
*Assistant Examiner*—Todd J. Kilkenny
(74) *Attorney, Agent, or Firm*—Robert H. Robinson; John M. Lorenzen; David F. Janci

(57) ABSTRACT

This invention relates to a process for making gypsum board comprising feeding a paper backing sheet and a fiberglass or plastic woven or non-woven scrim material in alignment to a board forming station, separating the paper and the scrim, feeding a high density calcium sulfate hemihydrate slurry into the trough formed between the paper and the scrim, and subsequently compressing the paper and the scrim into contact whereby the high density slurry is forced through the scrim, completely encapsulating the scrim in the high density slurry. As a result of this unique process, excellent bond is developed between the paper, the high density gypsum layer and the foamed gypsum core. The gypsum board has improved through-penetration strength.

10 Claims, 2 Drawing Sheets

PROCESS FOR MAKING GYPSUM BOARD HAVING IMPROVED THROUGH-PENETRATION STRENGTH

FIELD OF THE INVENTION

This invention relates to a process for making gypsum board having improved through-penetration strength. In particular, the invention relates to a process for encapsulating a fiberglass or plastic scrim (mesh) in a high density gypsum layer proximate the paper/gypsum layer interface. It is generally preferred to place the scrim at the back paper/gypsum layer interface. This process is particularly adapted to making a gypsum board having at least one face comprising a high density gypsum layer overlaying a lower density, foamed gypsum core. In accordance with the invention, a high density calcium sulfate hemihydrate slurry is placed between the back paper and the fiberglass or plastic scrim, forcing the slurry through the open mesh scrim, and thereby encapsulating the scrim with hemihydrate slurry and developing excellent bond between the paper, the high density gypsum layer and the foamed gypsum core.

BACKGROUND

In the gypsum wallboard industry, it is well known to manufacture gypsum board having at least one face comprise a layer of high density gypsum overlaying a lower density, foamed gypsum core. The high-density gypsum slurry has excellent adhesion with the paper sheet comprising the front face of the board and the low-density gypsum core.

Gypsum wallboard having a high-density layer on both faces has been commercially available for several years. However, it is desired to improve the through-penetration of the gypsum board and to improve further its abuse resistant properties. Fiberglass scrim and plastic scrim are materials that are known reinforcing agents in gypsum wallboard. These scrim materials are usually incorporated in the foamed gypsum core so as not to interfere with the bond between the paper facing sheets and the gypsum core.

It is an object of this invention to provide a process wherein a fiberglass scrim or plastic scrim is encapsulated in at least one high density gypsum layer in a gypsum wallboard between the facing paper and the low density, foamed gypsum core.

It is another object of this invention to provide a process wherein a high density calcium sulfate hemihydrate slurry is fed between a paper facing sheet and a fiberglass scrim or plastic scrim sheet and subsequently compressed wherein the scrim sheet is substantially encapsulated in the high density calcium sulfate hemihydrate slurry.

It is a further object of this invention to provide a gypsum wallboard having improved through-penetration strength.

These and additional objects and advantages of this invention will be readily understood from a consideration of the drawings and the following detailed description of the preferred embodiment.

BRIEF DESCRIPTION OF THE DRAWINGS

In the description of the preferred embodiments of the invention presented below, reference is made to the accompanying drawings, in which.

DESCRIPTION OF THE PREFERRED EMBODIMENTS

This invention relates to a process for making gypsum board having improved through-penetration strength. In particular, the process comprises a method for feeding a paper backing sheet and a fiberglass or plastic woven or non-woven scrim material in alignment to a board forming station, separating the paper and the scrim, feeding a high density calcium sulfate hemihydrate slurry into the trough formed between the paper and the scrim, and subsequently compressing the paper and the scrim into contact whereby the high density slurry is forced through the scrim, completely encapsulating the scrim in the high density slurry. The paper backing sheet/scrim/high density slurry is then passed to a forming station where it is brought into contact with a foamed, lower density calcium sulfate hemihydrate slurry traveling to the forming station on a paper facing sheet which may or may not be coated with a high density calcium sulfate hemihydrate slurry intermediate the lower density, foamed slurry and the paper sheet. The process of this invention is particularly adapted to making gypsum board having at least one face of the board comprise a layer of high density gypsum having a scrim material encapsulated therein and said high density gypsum is placed between the paper sheet and the foamed, lower density gypsum core.

In addition to one or more high-density gypsum layers between the foamed, lower density gypsum core and the facing and backing papers, both edges of the board preferably comprise a high-density gypsum material to provide edge hardness. The high density gypsum edge material may have the same formulation as the high density layer(s) in contact with the paper facing and backing sheets, or it may have its own unique formulation. In general, the high density facing layer(s) and edge materials have a dry density in the range of about 45 to about 60 $lbs./ft.^3$.

The gypsum core is formed from a calcium sulfate hemihydrate slurry comprising calcium sulfate hemihydrate, water, a foaming agent and stabilizers forming a relatively low density gypsum. The core density is lower because of the foam or air bubbles formed in the slurry by the foaming agent. In general, the low density gypsum core has a density in the range of about 10 to about 40 $lbs./ft.^3$.

For a description of a preferred embodiment of the invention, reference is made to the drawings that schematically illustrate a gypsum board manufacturing line.

Figure 1:
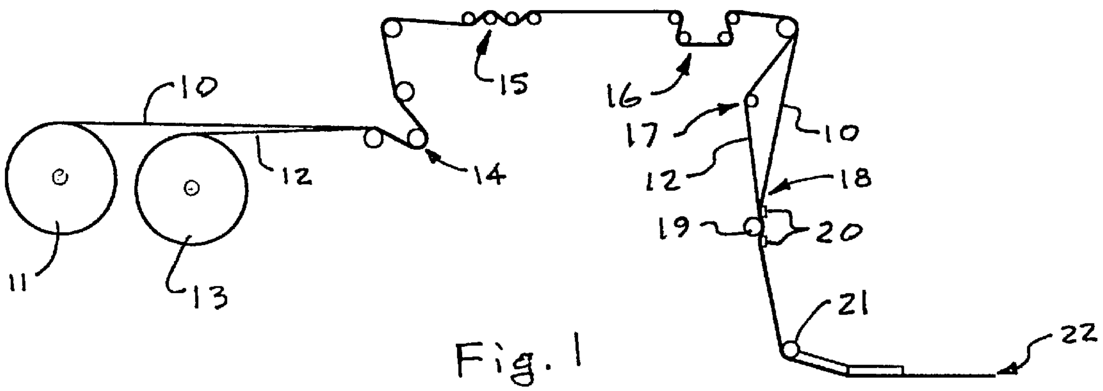
FIG. 1 is a side view of a schematic manufacturing line showing a paper and a fiberglass or plastic scrim being fed to a gypsum wallboard forming station.

FIG. 1 illustrates a portion of a gypsum board manufacturing line showing the formation of the back face of the board, but omitting the feed of the high-density calcium sulfate hemihydrate slurry. The paper sheet material (10) for the back of the board is obtained from a roll (11) of a standard backing paper. The scrim material (12) may be either fiberglass or plastic (e.g. polypropylene) and is also fed from a roll (13) of scrim material. Both rolls of material are positioned on saddles (not shown). The scrim and the paper are placed in alignment by threading them together through a splicer (14), a web guide (15) and a Fife guide (16). Thereafter, the paper and scrim are separated by passing the scrim (12) over a separator roll (17). As a result of the separation, a trough (18) is formed prior to passing the paper and the scrim between a roll (19) and anvils (20) where they are rejoined and compressed. The realigned paper and scrim are then passed over a hinge plate (21) to a gypsum board forming station, shown generally at (22).

Figure 2:
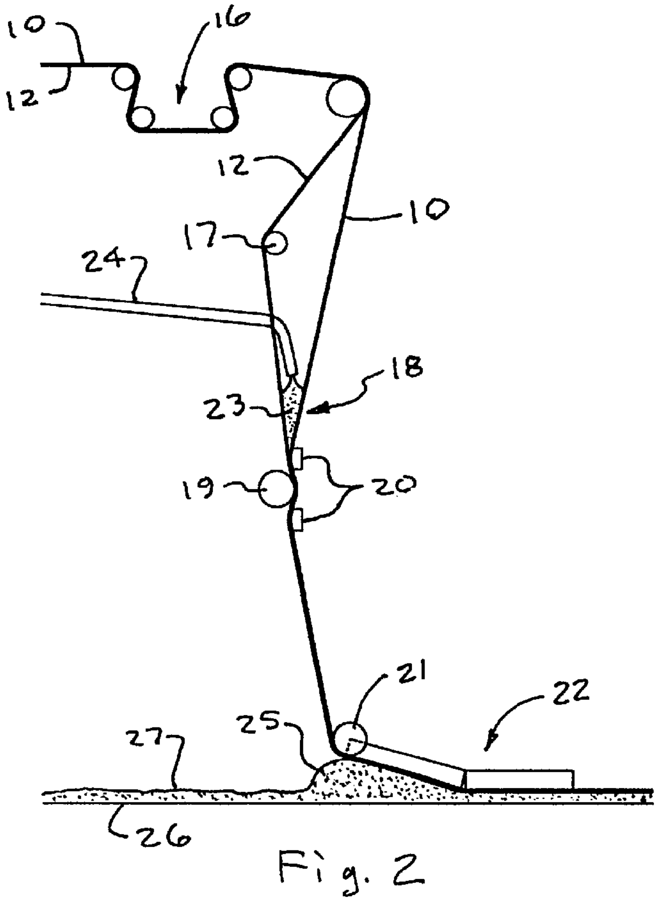
FIG. 2 is a side view of a schematic manufacturing line wherein high density calcium sulfate hemihydrate slurry is fed between a paper facing sheet and a fiberglass or plastic scrim sheet in accordance with this invention.

The process of this invention is more particularly illustrated in FIG. 2. Numerals used in FIG. 1 are also used in FIG. 2 to identify the same materials and apparatus. As shown in FIG. 2, a high-density calcium sulfate hemihydrate slurry (23) is fed through a slurry hose (24) and deposited between the paper and the scrim at the trough (18). The paper/scrim/high density slurry is then passed between the roll (19) and the anvils (20) where it is compressed and the scrim (12) is encapsulated in the slurry (23). After the paper/scrim/high density slurry pass over the hinge plate (21), they are brought into contact with the foamed, lower density calcium sulfate hemihydrate slurry (25) which is carried to the forming station (22) on a facing paper (26) coated with a layer of high density, calcium sulfate hemihydrate slurry (27). At the forming station, the papers, scrim and slurries pass under a forming plate (27) which folds the borders of the facing paper over the edge of uncured board.

Following the forming station, the uncured board passes along a belt (not shown) until the slurries have set to the point where the board can be cut to length and then passed to a kiln (not shown) for final curing. It should be noted that in the process illustrated in FIG. 2, both the front and the back of the board have high-density gypsum layers between the paper and the foamed gypsum core. If desired, the board may have only one high density layer; however, in accordance with this invention, the scrim would be encapsulated in the high-density gypsum layer.

EXAMPLE 1

⅝ inch thick gypsum wallboard panels having high-density gypsum layers on both the face and the back were manufactured in accordance with this invention by encapsulating fiberglass scrim in the high density backing layer. The following glass scrims were evaluated:

Scrim 1: a 9×9 (yarns per inch) scrim.

Scrim 2: a 6×6 (yarns per inch) scrim of the same fiberglass as Scrim 1, but at a wider spacing.

Scrim 3: a 5×5 (yarns per inch) scrim of a stronger fiberglass than Scrim 1, but at a wider spacing.

Figure 3:
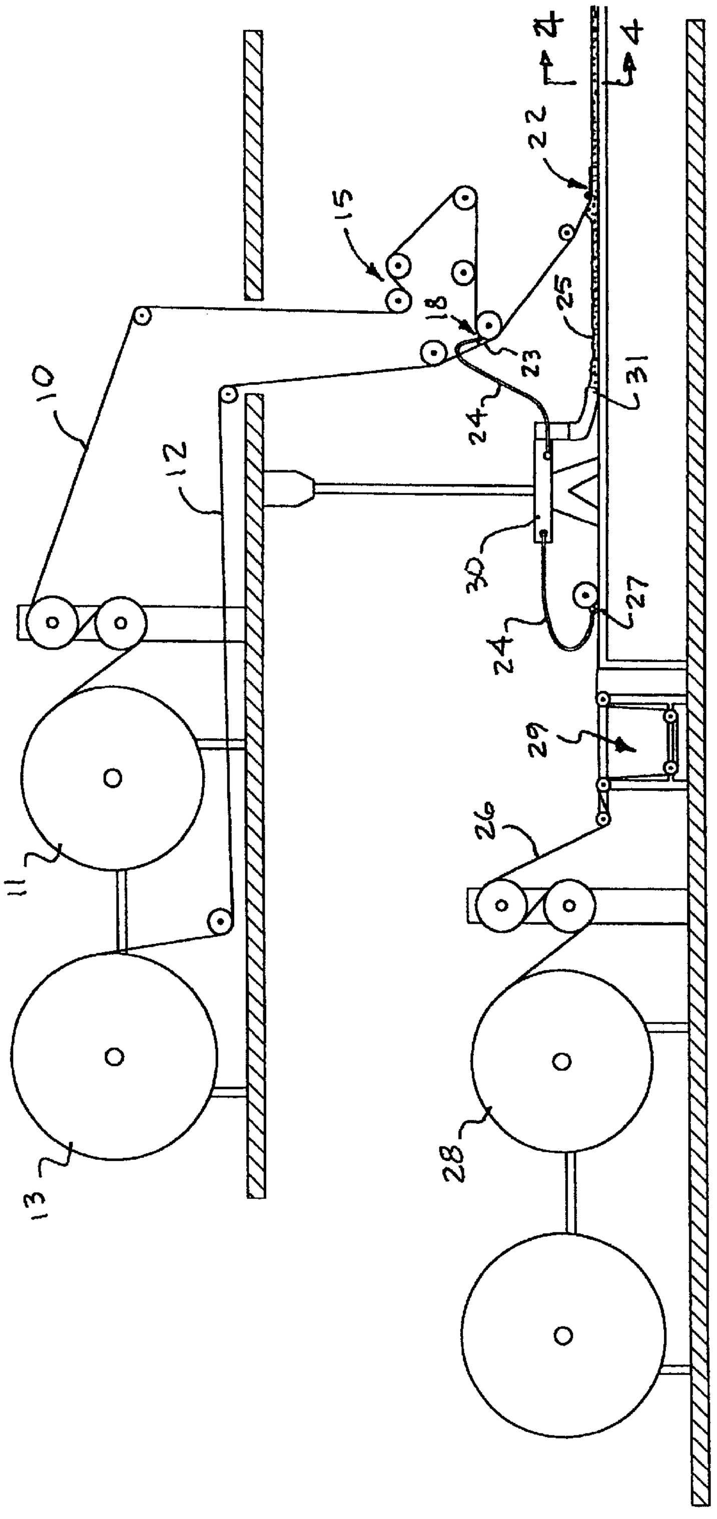
FIG. 3 is a side view of another schematic manufacturing line showing manila paper facing and newslined paper backing sheets being fed to the gypsum wallboard forming line.

The manufacturing line was set up as shown in FIG. 3. Numerals used in FIGS. 1 and 2 are also used in FIG. 3 to identify the same materials and apparatus. The fiberglass scrim (12) was fed from a roll (13) of fiberglass scrim material. The paper sheet material (10) for the back of the board was fed from a roll (11) of a standard newslined backing paper. In this set up, the paper and the scrim were not brought into contact until after the high-density calcium sulfate hemihydrate slurry (23), having a dry density of about 50 lb./ft.$^3$, was deposited in the trough (18). The paper (10) was run through a web guide (15) prior to contacting the slurry (23). The manila facing paper (26) was fed from a roll (28) of manila facing paper. The manila facing paper (26) was passed through a web guide (29) prior to depositing the high-density calcium sulfate hemihydrate slurry (27) on the manila facing paper (26). A gypsum mixer (30) was used to blend calcium sulfate hemihydrate, water, a foaming agent and stabilizers to form a low density, foamed calcium sulfate hemihydrate slurry (25) which was deposited through a spout (31) onto the manila facing paper (26) coated with a layer of high density, calcium sulfate hemihydrate slurry (27). The foaming agent was injected into the calcium sulfate hemihydrate slurry in the top of the spout (31) so as to provide a lower density core material (25) having a density of about 50 lb./ft.$^3$. Thereafter, the coated manila facing paper (26), the foamed calcium sulfate hemihydrate slurry (25), and the coated newslined backing paper (10) with the fiberglass scrim encapsulated in the high density, calcium sulfate hemihydrate slurry were passed to a gypsum board forming station (22).

Figure 4:
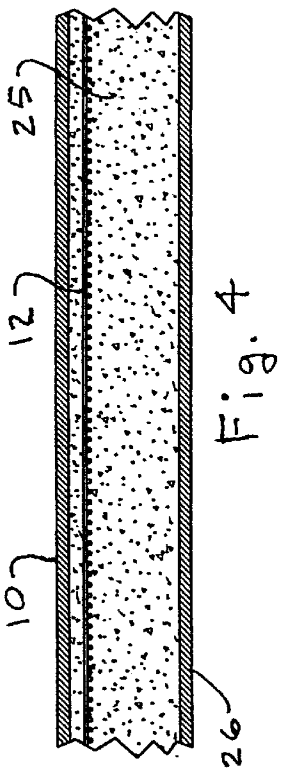
FIG. 4 is a cross-section of the gypsum board formed by the manufacturing line shown in FIG. 3 taken at line 4—4.

As shown in FIG. 4, the gypsum board panels of this invention consist of a newslined backing paper (10) in contact with a high density, calcium sulfate hemihydrate layer (23) into which is encapsulated a fiberglass scrim (12). The high density calcium sulfate hemihydrate layer is also in contact with a low density, foamed calcium sulfate hemihydrate core (25). The face of the gypsum board consists of a high density, calcium sulfate hemihydrate layer (27) and a manila facing paper (26).

After the gypsum board panels were made using the three different fiberglass scrims, the panels were tested for hard and soft body impact and compared to a conventional gypsum board having the same high density gypsum layer on both the facing and backing sides but having no scrim. The hard body impact tests were performed in accordance with the following procedure:

Each test specimen was attached to a frame constructed of 4 perimeter and 2 intermediate 20 gauge 3⅝ inches deep load-bearing steel studs fastened together with ⅜ inch type S pan head screws. The 2 vertical intermediate studs spaced 4 inches from the sides created a 16-inch vertical cavity centered in the frame. The board sample was attached to the specimen frame using four 1¼ inch bugle head screws spaced 8 inches o.c. in each of the 4 vertical studs.

The test apparatus consisted of a freely swinging rigid pendulum assembly that described a 21-inch radius arc. The hard body-impacting surface consisted of a 2-inch diameter rigid steel pipe cap mounted on the pendulum head such that it extends 7 inches in front of the centerline through the rigid pendulum arm. The pendulum was suspended from a rigid frame and positioned such that the impact head just contacted the test specimen surface when the pendulum was at rest. The drop height of the pendulum center of mass from its cocked (raised) position to the impact point was 12 inches. The frame was securely anchored to a solid base that resisted the overturning moment at impact and insured that the test specimen absorbed the full energy of impact.

At least 3 separate tests carried out to specimen failure were performed on 3 identical specimens. Each specimen was struck only once per test. The test specimen was securely and rigidly clamped to the pendulum frame at its vertical edges. The specimens were positioned such that the impact head struck the wall surface at the midpoint of the specimen.

With the test specimen securely fastened, the pendulum was released and allowed to drop without interference, striking the specimen with the impacting head. If the specimen did not fail, weight was added to the impacting head and the test repeated with a new specimen. This sequence was repeated until test specimen failure occurred, which was deemed to be through- penetration of the test specimen as evidenced by a crack or hole that penetrated the full thickness of the panel.

The failure energy was determined for the failed test specimen by multiplying the drop height (1-ft.) of the pendulum times the weight of the impact head in lbs.

The test specimens were attached to 20 gauge steel studs, 16 inches o/c, and the specimen panels were 2 ft.×2 ft. Tests were performed in increasing increments of 2.5 ft.-lbs., one impact per test specimen. Failure occurred when the impact head completely penetrated the panel.

The soft body impact tests were performed per ASTM E 695 in accordance with the following procedure:

The apparatus comprised a vertical impact load wall test frame assembly with impactor release as described in ASTM E 695-79 (Re-approved in 1991) without deflection set-up. The soft body impactor was a leather bag per ASTM E 695 filled with perlite ore (sand), having a total weight of 50 lbs. A 4-ft.×8-ft. wood stud (2 in.×4 in.) frame was used with the inner studs 16 inches o.c. The test panel was attached to the frame along the perimeter and 12 inch o.c. at the intermediate studs.

The test panel was positioned in the frame so that the impacting bag, at its center of gravity, struck the face of the test panel midway between the inner studs and the panel height. The initial bag release chute was set at a drop height of 6 inches. The drop height was increased in 6 inch increments until panel failure, defined as penetration that allows passage of light through the panel.

The soft body impact test differs from the hard body test whereby each specimen is repeatedly struck at progressively higher impact levels. When the impacting head broke through the scrim, the test specimen was considered to have failed. 6 specimens for each scrim were also tested for nail pull according to ASTM C473.

The test results were as shown below:

| Product | Hard Body Impact | Soft Body Impact | Nail Pull Avg. |
|---|---|---|---|
| Scrim 1 | 64.5 ft.-lbs. | 210 ft.-lbs. | 139.94 |
| Scrim 2 | 54.5 ft.-lbs. | 210 ft.-lbs. | 148.07 |
| Scrim 3 | 69.5 ft.-lbs. | 240 ft.-lbs. | 134.26 |
| Conventional | 44.8 ft.-lbs. | 150 ft.-lbs. | 78 |

The results indicate that for the impact tests, assuming equal scrim costs, a stronger yarn at a wider spacing is a better investment for impact performance.

EXAMPLE 2

⅝ inch thick gypsum wallboard panels having high density gypsum layers on both the face and the back were made to compare the encapsulation in the backing layer of fiberglass scrim versus polypropylene scrim. The manufacturing line was set up as shown in FIG. 3. The fiberglass scrim was similar to the scrim used in DUROCK cement board. The polypropylene scrim was made by Synthetic Industries. The gypsum board panels were tested for hard body and soft body impact. The test results were as shown below:

| Product | Hard Body Impact | Soft Body Impact |
|---|---|---|
| Fiberglass Scrim | 85 ft.-lbs. | 240 ft.-lbs. |
| Polypropylene Scrim | 79.5 ft.-lbs. | — |

The panels with the polypropylene scrim reached 79.5ft.-lbs. without failure. However, all of the test specimens had been used, and therefore, the hard body tests were discontinued and the soft body tests were not performed.

EXAMPLE 3

As a result of the promising test results for the polypropylene scrim, additional ⅝ inch thick gypsum wallboard panels having polypropylene scrim in the high density gypsum backing layer were made and tested for hard and soft body impact. The manufacturing line was set up as shown in FIG. 3.

In the hard body test, at 67 ft.-lbs., the start of spalling was observed on the backside of the test specimen as material between the integral mesh and back paper broke free. The scrim remained intact, so this was not considered a failure. The test specimen eventually failed at 89.5 ft.-lbs., when the impacting head tore through the scrim. In the soft body test, the impacting bag broke through the scrim and the test specimen was considered to have failed at 210 ft.-lbs.

This invention has been described in detail, with particular reference to preferred embodiments, but it should be appreciated that variations and modifications can be effected within the scope of the invention.

What is claimed is:

1. A process for making gypsum board having at least one face comprising a high density gypsum layer overlaying a lower density, foamed gypsum core comprising the following steps:

(1) feeding a first paper sheet material to a gypsum board manufacturing line;

(2) feeding a scrim material to the gypsum board manufacturing line;

(3) placing said paper sheet material and scrim material in alignment but separated whereby they form a trough;

(4) depositing a high density calcium sulfate hemihydrate slurry in the trough between said paper sheet material and said scrim material and into contact with said paper and scrim;

(5) compressing said paper sheet material, said scrim material and said high density hemihydrate slurry whereby said scrim material is encapsulated in said high density calcium sulfate hemihydrate slurry to form a laminated paper/scrim/hemihydrate slurry;

(6) passing the laminated paper/scrim/hemihydrate slurry to a gypsum board forming station;

(7) bringing said laminated paper/scrim/hemihydrate slurry into contact with a foamed, lower density calcium sulfate hemihydrate slurry at said board forming station, said foamed, lower density slurry being carried on a second paper sheet material; and (8) passing the paper sheet materials with the scrim and both high density and lower density slurries there between along the manufacturing line until they are sufficiently cured to the point where they can be cut to length and passed to a kiln for final curing.

2. A process in accordance with claim 1 wherein said scrim material is selected from fiberglass scrim and plastic scrim.

3. A process in accordance with claim 2 wherein the scrim material is plastic and comprises polypropylene fibers.

4. A process in accordance with claim 1 wherein the high density, calcium sulfate hemihydrate slurry has a density in the range of about 45 lbs./ft.$^3$ to about 60 lbs./ft.$^3$.

5. A process in accordance with claim 1 wherein the foamed, lower density calcium sulfate hemihydrate slurry has a density in the range of about 10 lbs./ft.$^3$ to about 40 lbs./ft.$^3$.

6. A process in accordance with claim 1 wherein in step (7) said second paper sheet material has a coating of high density, calcium sulfate hemihydrate slurry between the paper and the foamed, lower density calcium sulfate hemihydrate slurry.

7. A process in accordance with claim 1 wherein the first paper sheet material is newslined paper that is the back of the gypsum board.

8. A process in accordance with claim 1 wherein the second paper sheet material is manila paper that is the front of the gypsum board.

9. A process in accordance with claim 1 wherein said first paper sheet material and the scrim material are brought into contact and alignment in step (3) and subsequently separated to form the trough prior to depositing the high density, calcium sulfate hemihydrate slurry in the trough.

10. A process for making gypsum board having both front and back faces comprising a high density gypsum layer overlaying a lower density, foamed gypsum core comprising the following steps:

(1) feeding a newslined paper sheet material to a gypsum board manufacturing line;

(2) feeding an open mesh scrim material selected from fiberglass scrim and plastic scrim to the gypsum board manufacturing line;

(3) forming a trough with said newslined paper sheet material and said scrim material which are fed from separate lines and are not aligned until after contact with a high density calcium sulfate hemihydrate slurry;

(4) depositing a high density calcium sulfate hemihydrate slurry, having a density in the range of about 45 lbs./ft.$^3$ to about 60 lbs./ft.$^3$, in the trough between said newslined paper sheet material and said scrim material and into contact with said paper and scrim;

(5) compressing said paper sheet material, said scrim material and said high density hemihydrate slurry whereby said scrim material is encapsulated in said calcium sulfate hemihydrate slurry to form a laminated paper/scrim/hemihydrate slurry;

(6) passing the laminated paper/scrim/hemihydrate slurry to a gypsum board forming station;

(7) depositing a foamed, lower density calcium sulfate hemihydrate slurry, having a density in the range of about 10 lbs./ft.$^3$ to about 40 lbs./ft.$^3$, on top of a high density, calcium sulfate hemihydrate slurry, which has a density in the range of about 45 lbs./ft.$^3$ to about 60 lbs./ft.$^3$, said high density, calcium sulfate hemihydrate slurry being carried on a manila facing paper;

(8) at said board forming station, bringing said laminated paper/scrim/hemihydrate slurry which was compressed in step (5) into contact with said foamed, lower density calcium sulfate hemihydrate slurry which was deposited on the high density, calcium sulfate hemihydrate slurry in step (7); and (9) passing the paper sheet materials with the scrim and both high density and lower density calcium sulfate hemihydrate slurries there between along the manufacturing line until they are sufficiently cured to the point where they can be cut to length and passed to a kiln for final curing.

* * * * *